United States Patent [19]

De Seroux et al.

[11] Patent Number: 5,180,541
[45] Date of Patent: Jan. 19, 1993

[54] HANDLING FLASK COMPRISING A DEVICE FOR DISPLACEMENT OF A LOAD ALONG A VERTICAL AXIS

[75] Inventors: Nicolas De Seroux; Dominique Limouzin, both of Lyon, France

[73] Assignee: Framatome, Courbevoie, France

[21] Appl. No.: 683,188

[22] Filed: Apr. 10, 1991

[51] Int. Cl.⁵ .............................................. G21C 19/10
[52] U.S. Cl. .................................... 376/271; 254/292; 254/294; 414/626
[58] Field of Search ................ 376/271, 264, 268, 269; 254/284, 285, 290, 291, 292, 294, 335, 337; 414/146, 626; 187/20, 26

[56] References Cited

U.S. PATENT DOCUMENTS

| | | | |
|---|---|---|---|
| 3,095,102 | 6/1963 | Nadler | 376/271 |
| 3,145,636 | 8/1964 | Hall et al. | 376/249 |
| 3,179,569 | 4/1965 | Fortescue et al. | 376/270 |
| 3,654,869 | 4/1972 | Lehrer | 254/292 |
| 4,623,509 | 11/1986 | Fabris | 376/271 |

FOREIGN PATENT DOCUMENTS

2582438 11/1986 France.

OTHER PUBLICATIONS

"Operation and Maintenance of the Fuel Handling Equipment at Tokai No. 2 BWR Nuclear Power Station", Nuclear Energy, Oct. 1984, pp. 307-314.

*Primary Examiner*—Daniel D. Wasil
*Attorney, Agent, or Firm*—Pollock, Vande Sande & Priddy

[57] ABSTRACT

The device comprises two winches (12, 12') fastened to the outer surface of a hollow body (2) having a vertical channel (3) in which the load (4) is displaced. Each of the winches (12, 12') comprises two drums (13a, 13b) driven by a common motor (14). The drums (13a, 13b) of a first winch (12) are each arranged opposite a drum of the second winch (12') in relation to the axis of the channel (3). The device comprises two cables (15a, 15b) which are common to two drums located opposite one another around the body (2). The cables (15a, 15b) are wound with their end part on the drums located opposite one another and on their run between the drums pass over deflecting pulleys (16a, 16b), the axis of which is stationary, and over load-supporting pulleys (34a, 34b), the axis of which is movable and accompanies the load. The device ensures that the load is held and displaced in the event of a failure of one of the motor assemblies (14) and in the event of a break of one of the cables. The device can be used particularly for ensuring the lifting of a fuel assembly in a flask for handling the fuel assembly.

10 Claims, 4 Drawing Sheets 5,180,541

HANDLING FLASK COMPRISING A DEVICE FOR DISPLACEMENT OF A LOAD ALONG A VERTICAL AXIS

FIELD OF THE INVENTION

The invention relates to a device for the displacement of a load along a vertical axis of a well, and particularly to a lifting device associated with a fuel-assembly handling flask.

BACKGROUND OF THE INVENTION

Fast-neutron nuclear reactors cooled by a liquid metal, such as sodium, comprise a core consisting of assemblies of elongate prism-shaped form immersed in liquid sodium contained in the reactor vessel.

It may be necessary to extract fuel assemblies from the reactor core within the vessel, for example in order to replace spent or defective assemblies by new assemblies. The assemblies which are taken out of the reactor vessel are in the irradiated state and generate radioactive radiation and an emission of heat.

The fuel assemblies taken out of the vessel of the nuclear reactor must therefore be arranged in containers affording biological protection of the environment in which the assemblies are displaced or stored temporarily.

In carrying out the transfer of the fuel assemblies of fast-neutron nuclear reactors, it is customary to use handling flasks comprising a solid body which is made of a material absorbing nuclear radiation and in which is formed a channel passing through the body of the flask in its longitudinal direction and in a central position and serving as a receptacle for a fuel assembly introduced into the handling flask.

The channel opens out via a sealingly closable orifice at one of the ends of the body of the flask to make it possible to introduce an assembly into the flask and to extract it. During operations of introducing a fuel assembly into the flask and extracting it therefrom, the flask is arranged in such a way that the channel receiving the fuel assembly is in vertical position. The operations of introducing and extracting a fuel assembly are executed by means of a lifting set comprising winches associated with the flask and making it possible for the assembly fastened to a grab at its upper end to be displaced within the channel passing through the flask and in its axial extension.

The well shut-off device arranged in the lower part of the flask is generally connected to a corresponding device associated, for example, with a fuel-assembly passage well passing through the closing slab of the vessel of the nuclear reactor.

It is obvious that the operations of transferring the fuel assemblies between the reactor vessel and a handling flask must be conducted with a very high degree of safety, since incidents, such as the fall of a fuel assembly during its transfer, a failure of the lifting means of the assembly during transfer or a lack of cooling of the assembly, can cause damage to the fuel assembly or to some components of the reactor, a considerable delay in the handling operations or other harmful consequences resulting in an increase in the operating costs of the nuclear reactor.

It may also be necessary to employ emergency procedures which involve an extremely high outlay and which can require the intervention of operators in zones subjected to irradiation.

The lifting means associated with a fuel-assembly handling flask are therefore designed so as to include some redundancy in terms of their capabilities of holding and displacing the load consisting of the fuel assembly fastened to the grab being displaced in the channel of the flask.

Such lifting devices generally comprise a double winch installed in the upper part of the flask and consisting of two motor shafts carrying a cable-winding drum at each of their ends.

Two cables are each wound on two drums driven by different motor shafts and ensure the suspension and displacement of a grab comprising load attachment means. The grab has a support, on which are mounted pulleys which interact with the cables in order to ensure the suspension and displacement of the load.

This device, which affords great operating safety in that it has redundancy making it possible to limit the consequences of a cable break or of a motor failure, has the disadvantage of considerably increasing the bulk of the flask, the upper part of which carries the set of lifting means. The mass of these lifting means therefore means that the center of gravity of the flask as a whole is located at an appreciable height, this having an effect on the anti-seismic devices to be provided.

To make it easier to handle the flask during the transfer of a fuel assembly and to store flask during the periods when it is not being used, it is entirely desirable to reduce the volume of the flask as much as possible and to lower the position of the center of gravity.

SUMMARY OF THE INVENTION

The object of the invention is to provide a device for the displacement of a load in the vertical direction along the axis of a channel formed in the central part of a hollow body, comprising at least two sets of two drums which are driven by two motor devices and on which are wound two cables for the suspension and displacement of a grab movable in the channel and in its axial extension and comprising load attachment means and a support equipped with pulleys over which the cable passes, this displacement device making it possible to lower the position of the center of gravity and to reduce the bulk of the unit consisting of the hollow body, in which the load displacement channel is formed, and of the displacement device itself, while at the same time permitting operation with a very high degree of safety, especially in the event of a cable break or of a failure of a motor device.

To this end, each of the sets of two drums driven by a motor means and constituting a winch is fastened to the outer surface of the hollow body, in such a way that the drums of each of the winches are each located opposite one of the drums of the other winch in relation to the vertical axis of the channel, the cable associated with each of the drums of a first winch being common to the drum of the second winch located opposite in relation to the axis of the channel and interacting with a set of deflecting pulleys and at least one grab-supporting pulley on its run between the two drums on which it is wound at its ends.

BRIEF DESCRIPTION OF THE DRAWINGS

To make it easy to understand the invention, an embodiment of a device for lifting a fuel assembly of a fast-neutron nuclear reactor, associated with a handling flask, will now be described by way of example, with reference to the accompanying drawings.

DESCRIPTION OF PREFERRED EMBODIMENT

Figure 1:
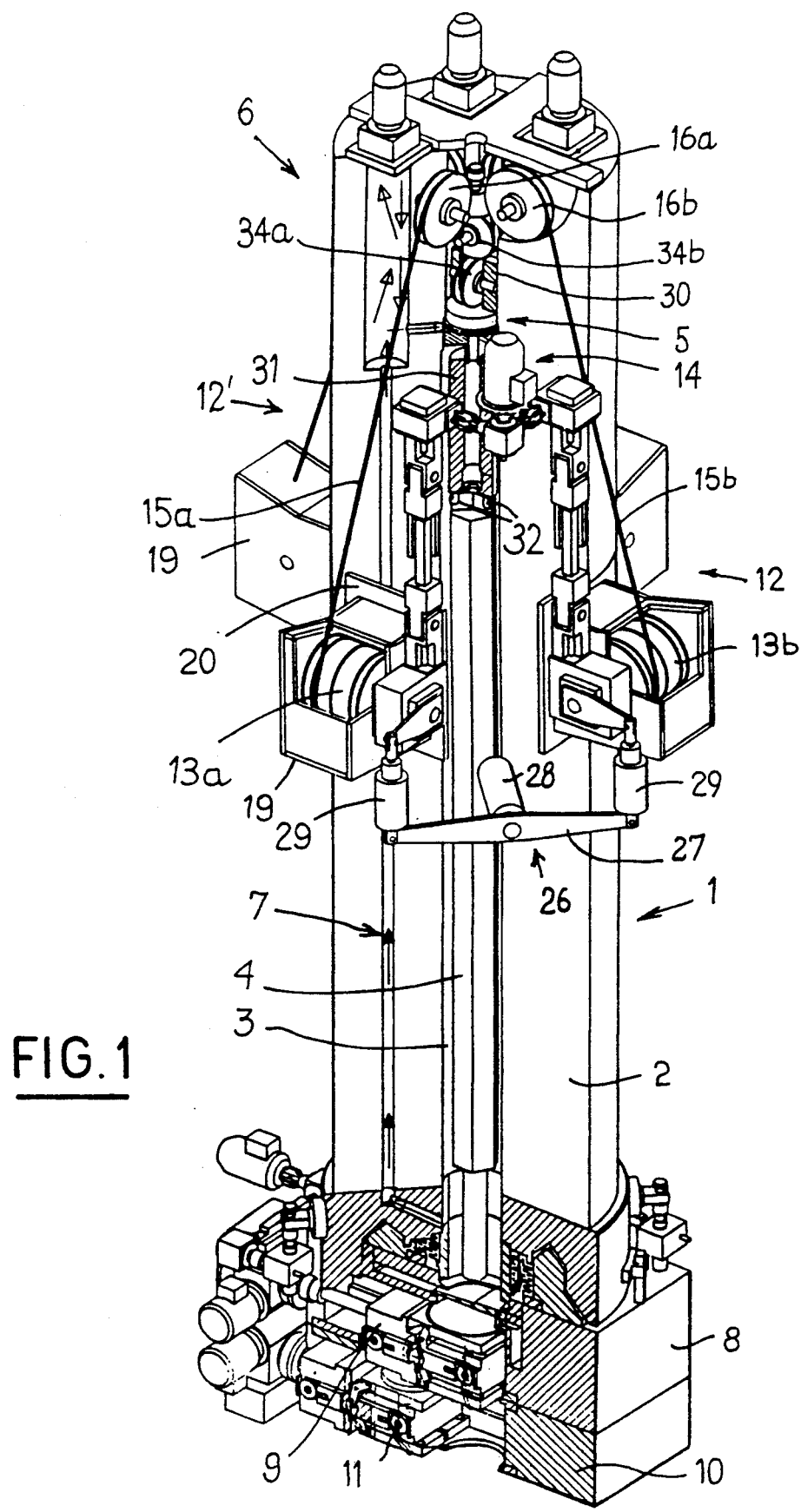
FIG. 1 is a partially sectional cutaway perspective view of a fuel-assembly handling flask having a displacement device according to the invention.

FIG. 1 shows a handling flask 1 for a fuel assembly of a nuclear reactor. The flask comprises a cylindrical body 2 having a channel 3 passing through its central part and along its axis, over its entire length. The channel 3 serves as a receptacle for an assembly 4, the handling of which is ensured by using the flask 1.

The fuel assembly 4 is suspended on a grab 5 which makes it possible to hold it and displace it in the vertical direction within the channel 3 and in its axial extension by means of a displacement device 6 which will be described in more detail hereinbelow.

The body 2 of the flask consists of a solid steel piece of great thickness in the radial direction and of great length.

With regard to a fast-neutron reactor fuel assembly longer than 4 meters and having a hexagonal cross-section, the side of which has a length of 125 mm, the body 2 of the flask has an outside diameter of 1.30 m, a central channel 3 of a diameter of 0.30 m and a length of the order of 6 m. The flask body therefore has a wall thickness of 0.50 m; its total mass is about 55 tons.

The lower part of the body 2 is connected to the support 8 of a motorized flask valve 9 making it possible to carry out the sealing opening or closing of the lower end of the channel 3 opening out at the end of the body 2. The support 8 of the flask valve can be connected to the support 10 of a valve 11 making it possible to carry out the sealing opening or closing of a passage well, for example a passage through a slab covering the vessel of a reactor filled with liquid sodium and containing the reactor core. When the valves 9 and 11 are superposed and opened, the fuel assembly 4 can be displaced in the vertical direction from a position immersed in the liquid sodium to its transfer position within flask 1 by the use of the lifting device 6 according to the invention.

The lifting device also makes it possible to cause the assembly to pass from its position within the flask to a position immersed in the liquid sodium filling the vessel of the nuclear reactor.

Flask 1 also comprises a gas-circulation cooling circuit 7 making it possible to discharge the heat emitted by the fuel assembly 4 after it has been extracted from the vessel of the nuclear reactor.

Figure 2:
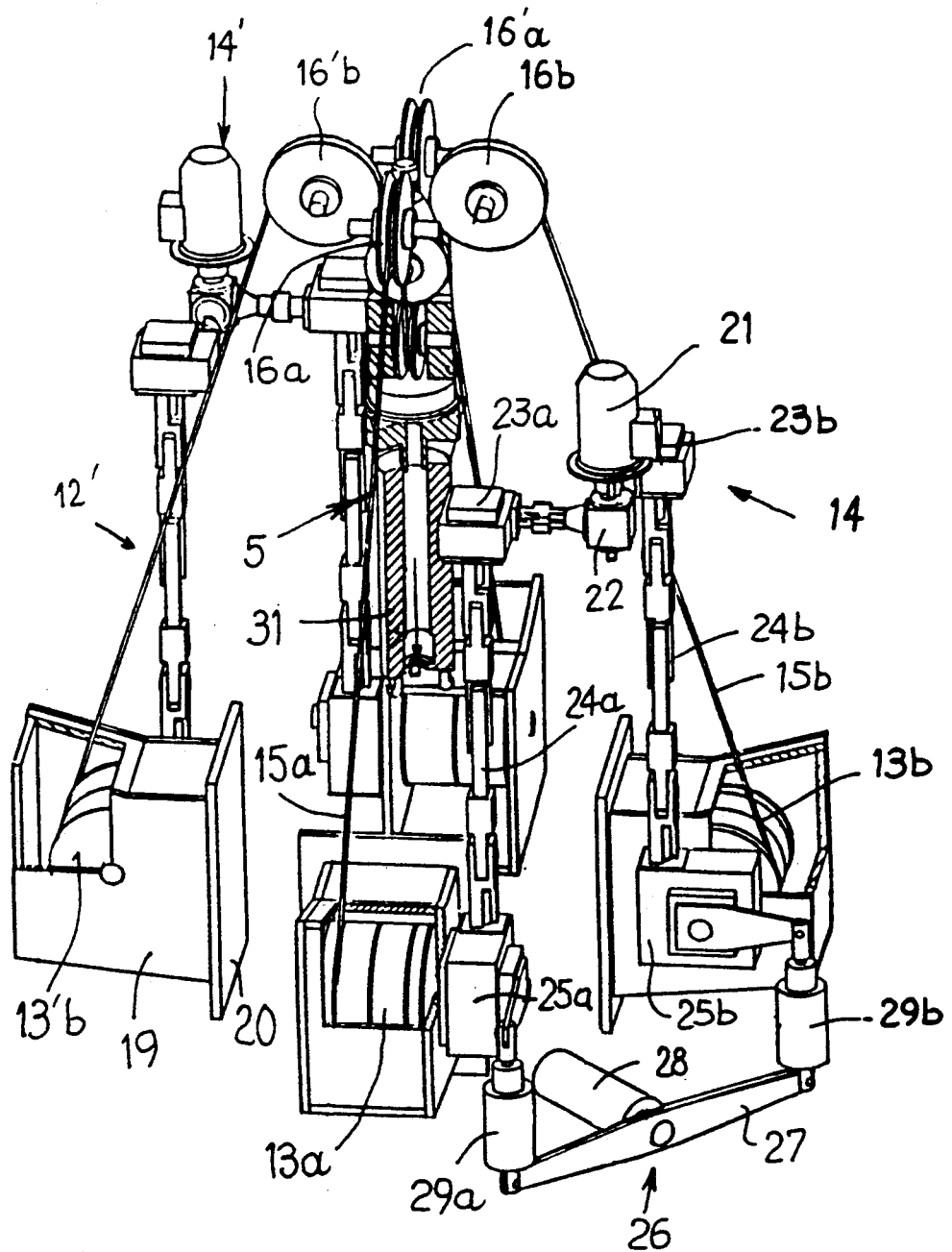
FIG. 2 is a perspective view of the fuel-assembly displacement device associated with the flask and shown in FIG. 1.
Figure 3:
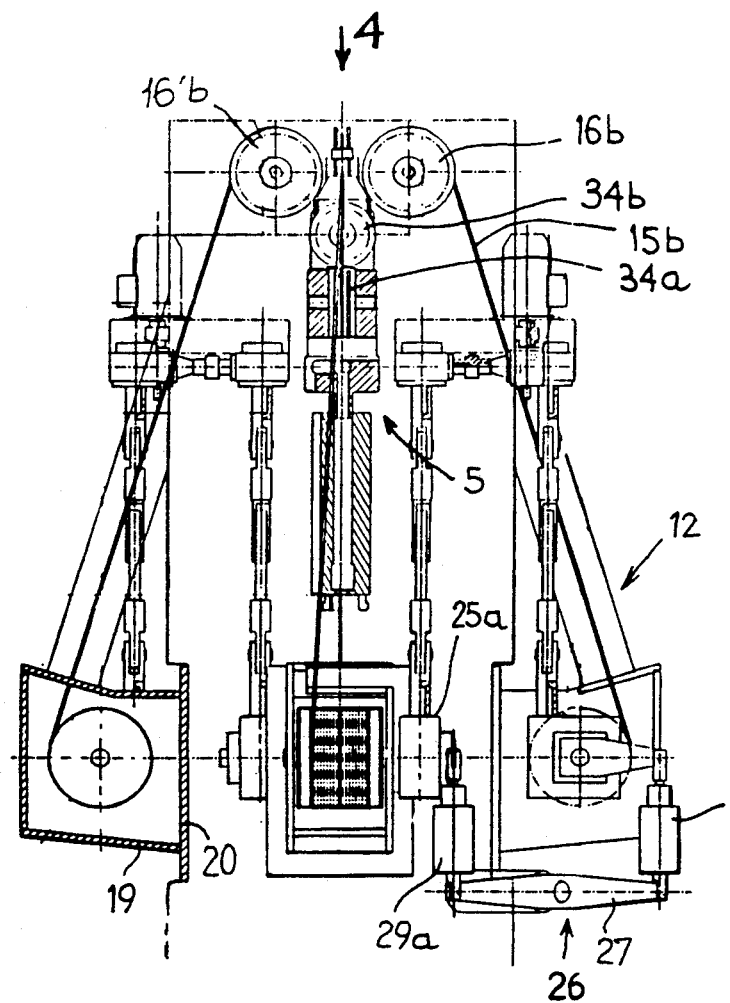
FIG. 3 is a partially sectional side elevation view of the displacement device according to the invention shown in FIG. 2.
Figure 4:
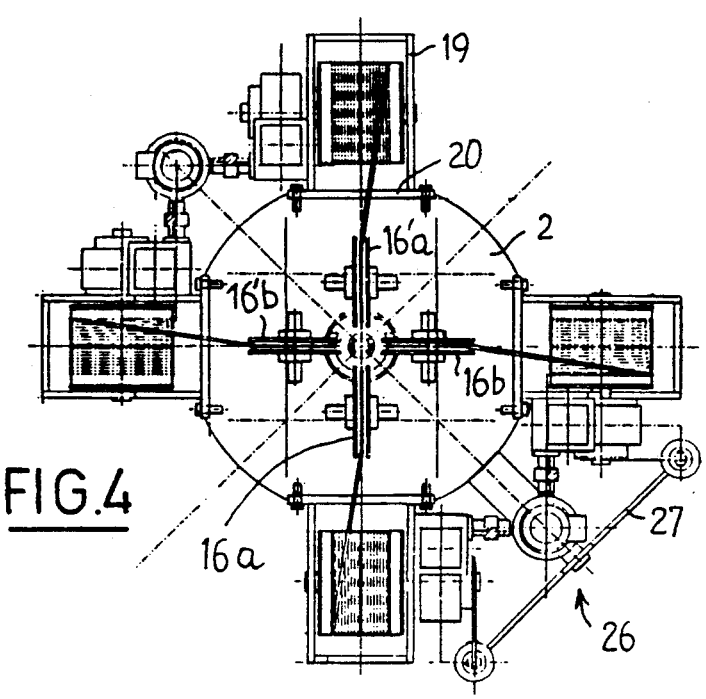
FIG. 4 is a top plan view in the direction of 4 of FIG. 3.

Reference will now be made to FIGS. 2 to 4 and to FIGS. 5 to 7 in order to describe the displacement device 6 associated with the handling flask 1.

The corresponding elements in FIGS. 1 to 4 and 5 to 7, respectively bear the same references.

Figure 5:
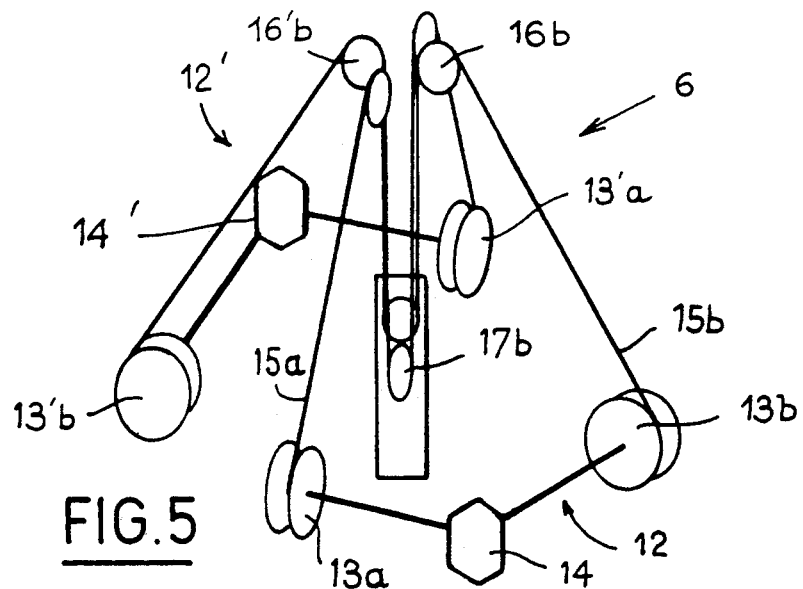
FIGS. 5, 6 and 7 are schematic views corresponding respectively to FIGS. 2, 3 and 4 and showing the main elements and the operating mode of a displacement device according to the invention.

As shown in FIG. 5, the displacement device 6 according to the invention comprises a first winch 12 and a second winch 12' with two drums 13a and 13b (13'a and 13'b for the winch 12') driven by the same motor device 14 (14' for the winch 12').

Figure 7:
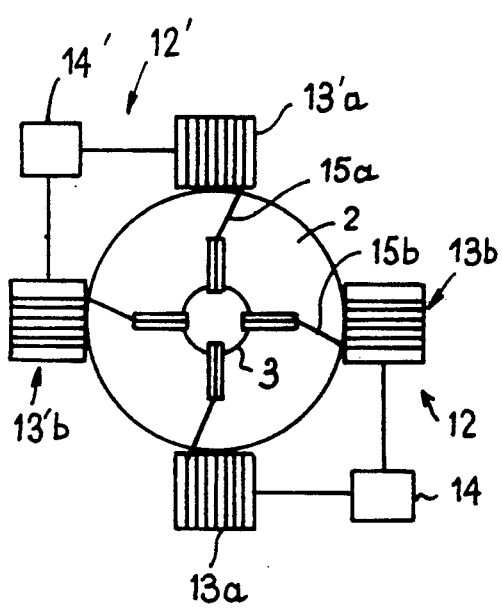

As shown in FIG. 7, the winches 13a, 13b, 13'a, 13'b are arranged around the body 2 of the flask 1 in positions located substantially at 90° to one another.

The same cable 15a is wound at its ends on the drums 13a and 13'a located in positions substantially symmetrical in relation to the axis of the channel 3 and of the body 2, i.e., located opposite one another in relation to the vertical axis of the channel 3.

Likewise, the same cable 15b is wound at its ends on the drums 13b and 13'b located in positions opposite one another in relation to the axis of the channel 3 on the periphery of the body 2.

Figure 6:
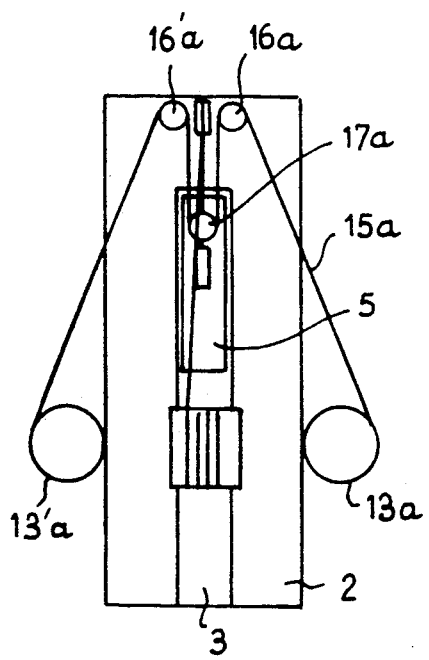

As can be seen in FIGS. 5 and 6, the part of cable 15a located between the drums 13a and 13'a, passes over a first deflecting pulley 16a mounted rotatably on the body 2 of the flask, then over a supporting pulley 17a mounted on the body of the grab 5 and finally over a second deflecting pulley 16'a.

In the same way, the part of cable located between the drums 13b and 13'b passes over a first deflecting pulley 16b, over a supporting pulley 17b and over a second deflecting pulley 16'b.

Reference will now be made to FIGS. 1 to 4 in order to describe in more detail the displacement device of the invention shown schematically in FIGS. 5 to 7.

Each of the drums 13a, 13'a, 13b, 13'b is mounted for rotation about a horizontal axis in a housing 19 fixed to a fastening baseplate 20 which is screwed to a flap machined on the outer surface of the upper part of body 2.

The four housings 19 of the drums 13a, 13b, 13'a, 13'b are arranged at 90° from one another around the body 2 of the flask.

The drums 13a and 13b of the winch 12 are driven in rotation by the same motor device 14 comprising an electric motor 21, a bevel-gear transmission element 22 and, for driving each of the drums 13a and 13b respectively, two secondary reducers 23a and 23b, two cardan shafts 24a and 24b and two main reducers 25a and 25b connected to the housing 19 of the corresponding drum.

The main reducers 25a and 25b are reducers of the floating-body type, the body of which is mounted on the driving shaft of the corresponding drum 13a or 13b.

The winch 12 has a rocker-type balancing unit 26 connecting the driving means of the drums 13a and 13b by way of their floating reducers.

The unit 26 comprises a rocker 27 mounted pivotally on the body 2 of the flask by means of a bearing 28 fixed to the flask and of an axle mounted rotatably in the bearing and fixed to the central part of rocker 27.

The end of each of the branches of the rocker is connected to a spring-type balancing device 29a or 29b comprising a piston rod connected to the body of the corresponding floating reducer 25a or 25b by a connecting arm and elastic return means consisting of Belleville washers bearing on the rod of the piston within the body of the corresponding balancing device 29a or 29b.

The unit 26 makes it possible to balance the loads supported by the cables 15a and 15b during the displacements of the load consisting of the fuel assembly within the channel 3 of the flask and in its axial extension.

When there is a momentary unbalance, tilting of the rocker 27 about its axis brings about a rebalancing of the loads under the effect of the displacement of the piston rods interacting with the elastic return means. The torques transmitted to each of the drums by the motor assembly are thus rebalanced, with the result that the tension and load experienced by each of the cables 15a and 15b quickly into balance.

Only the winch 12 has a load-balancing unit 26; the winch 12' does not. It is sufficient, in fact, if one of the two winches has a balancing device, inasmuch as the cables 15a and 15b are wound at their ends on the drums 13a, 13'a, 13b, 13'b located in positions opposite one another in relation to the axis of the channnel 3 corresponding to the axis of displacement of the load.

As can be seen in FIGS. 2 and 3, each of the cables 15a and 15b passes over two deflecting pulleys 16a (16'a for the cable 15a) and 16b (16'b for the cable 15b).

The deflecting pulleys 16a, 16'a, 16b and 16'b are mounted for rotation about horizontal axes in the upper part of the flask body 2, in such a way that the pairs of pulleys 16a, 16'a and 16b, 16'b have grooves for guidance of the corresponding cable which are arranged in two planes of axial symmetry of the body 2 of the flask. These two planes of axial symmetry are perpendicular to one another and correspond to the planes of symmetry of the pairs of drums 13a, 13'a and 13b, 13'b located opposite one another on either side of the flask body 2.

As can be seen in FIGS. 1 to 3, the grab 5 for attachment of the assembly 4 comprises a body 30 forming its upper part and a tubular suspension element 31 forming its lower part and equipped with attachment means 32 for the fuel assembly 4.

Mounted in the support 30 of the grab are two supporting pulleys 34a and 34b, of which the grooves for winding the corresponding cable 15a or 15b are arranged in the axial planes of symmetry of flask 2 which are defined by the pairs of deflecting pulleys 16a, 16b and 16'a, 16'b.

The cables 15a and 15b are engaged in the lower part of the groove of the supporting pulleys 34a and 34b, respectively, in order to ensure the suspension of the assembly 4 by means of the grab 5.

Each of the cables 15a and 15b therefore passes successively over a first deflecting pulley, over a supporting pulley and over a second deflecting pulley on its run between the drums located in positions opposite to one another in relation to the axis of the channel 3 of the cupboard.

Thus, by rotating the drums of the winches 12 and 12' either in the winding direction or in the unwinding direction of the cables 15a and 15b, upward or downward displacement of the load consisting of the fuel assembly 4 fastened to the grab 5 is obtained in the vertical direction corresponding to the axis of the channel 3.

The device according to the invention has a redundancy making it possible to ensure that the load is displaced and retained in the event of a failure of one of the motor assemblies 14 and 14' and/or in the event of the break of one of the suspension and displacement cables 15a and 15b.

Each of the drums 13a, 13b and 13'a, 13'b of the winches 12 and 12' is intended to make it possible to wind a length of cable greater than the length necessary for raising the load to its upper position, as shown in FIG. 1, by the use of the two winches 12 and 12'.

Should one of the motor assemblies 14 or 14' experience a failure during the raising of the load, the winch driven by the second motor assembly is then capable by itself of ensuring that the load is raised to its upper position as the result of the winding of an extra length of cable onto each of its two drums. In fact, the drums of the second winch of which the motor assembly has failed remain stationary during the raising and constitute fixed elements of the attachment of the ends of each of the cables 15a and 15b.

Likewise, should the motor assembly 14 or 14' of one of the winches 12 or 12' experience a failure during the lowering of the load, the deplacement device according to the invention is capable of carrying out the lowering of the load to its lowest position. For this purpose, each of the cables 15a and 15b has a length greater than the length necessary for lowering the load to its lowest position by the use of the two winches.

The extra length of each of the cables 15a and 15b makes it possible to ensure the lowering of the load to its lowest point by the use of only one of the two winches, the drums of the second winch, the motor assembly of which has failed, remaining stationary and ensuring the fastening of one of the ends of the cables 15a and 15b.

Moreover, the cables 15a and 15b intersect in the region of the support 30 of the grab and are capable of ensuring the suspension of the load independently of one another by means of a grab-supporting pulley.

Should one of the cables 15a or 15b break while the displacement device according to the invention is being used, the second cable is capable of taking up the load, without this load becoming appreciably unbalanced.

In fact, in the event of a break of one of the cables, the lever connected to the body of the floating reducer of the corresponding drum is displaced and, by means of the piston rod of the corresponding device 29, causes the rocker 27 of the balancing unit 26 to tilt. The lever is brought up against a stop by means of the piston rod acting on the elastic retention means, and a jolt in the operation of the displacement device is prevented as a result of the deformation of the elastic retention means consisting of Belleville washers.

The load is maintained in its balanced position and the remaining cable is capable of ensuring that this load is held and displaced.

The load displacement device according to the invention therefore has a very high degree of operating safety and ensures that the load is displaced and held, even in the event of a failure of a motor assembly and/or of a cable break.

Furthermore, this device can easily be integrated in a unit for the transport of a load, such as a flask for handling a fuel assembly, while at the same time making it possible to design the transport unit in such a way that its volume is reduced and its possibilities of use are increased.

The distribution of the drums of the two winches around the body of the flask in a crosswise arrangement makes it possible to reduce the total bulk of the flask to a minimum, avoid placing bulky lifting means in the upper part of the flask and thus lower the level of the center of gravity.

Moreover, the motor assemblies of each of the winches can be arranged relative to the drums which they drive in a position remote from these drums, allowing the installation of the motor means to become easier and the total bulk of the device to be reduced.

Thus, the crosswise arrangement of the drums can be different from that described and illustrated, and the axial planes of symmetry of these drums can form an angle other than 90°. At all events, however, the drums of each of the winches are each located opposite a drum of the second winch in relation to the vertical axis of the well corresponding to the axis of displacement of the load.

The motor assemblies for driving the winches can have a form different from that described. It is advantageous, however, to design these motor assemblies in such a way that they can be remote from the drums which they drive, in order to make it easier to install them on the transport unit, such as a handling flask, with which the displacement device is associated.

The device for balancing a load between the two cables may be other than a rocker connected to two floating reducers for driving the drums of a winch by way of elastic damping means.

The load suspension grab can likewise be different from that described and which is suitable for the use of the grab within a flask for handling a fuel assembly extracted from the core of a nuclear reactor.

Finally, the displacement device according to the invention can be associated with a unit having a vertical channel formed in the central part of a hollow body other than a fuel-assembly handling flask. This unit can be either a movable transport unit or a fixed unit for the displacement of a load in the vertical direction.

We claim:

1. A handling flask for handling a load, comprising a hollow body having a vertical channel in a central part of said hollow body and a device for vertical displacement of said load along an axis of said channel, comprising at least two sets of two drums which are driven by two motor means and on which are wound two cables for suspension and displacement of a grab movable in said channel and in an axial extension of said channel and comprising attachment means for said load and a support equipped with pulleys over which said cables pass, wherein each of said sets of two drums driven by a motor means and constituting a winch is fastened to an outer surface of said hollow body, in such a way that said drums of each said winch are each located opposite one of said drums of the other said winch in relation to the vertical axis of said channel, said device for vertical displacement of said load further comprising
   (a) a first cable having ends wound on a first and a second drum situated at opposite locations on said hollow body and, on a run of said cable between said first and second drums, on a set of deflecting pulleys and at least one pulley mounted on said support for supporting said grab; and
   (b) a second cable having ends wound on a third and a fourth drum situated at opposite locations on said hollow body and, on a run of said cable between said third and fourth drums, on a set of deflecting pulleys and at least one pulley mounted on said support for supporting said grab.

2. Handling flask according to claim 1, wherein said drums of said winches are arranged around said hollow body in a crosswise arrangement, positions of the four drums being offset angularly by 90° relative to one another about said axis of said channel corresponding to an axis of displacement of said load.

3. Handling flask according to claim 1, wherein each of said drums is adapted to wind a length of cable greater than a length necessary for carrying out displacement of said load to a highest position of said load.

4. Handling flask according to claim 1, wherein said first and second cables have length greater than a length of cable necessary for displacing said load to a lowest position of said load.

5. Handling flask according to claim 1, further comprising a unit for rebalancing said load between said two cables, said unit being connected to driving means of each of said two drums of one of said winches.

6. Handling flask according to claim 5, wherein said driving means of each of said drums of one of said winches consist of reducers of a floating-body type, and said load-rebalancing unit consists of a rocker mounted pivotally on a central part of said hollow body and carrying, at ends of said rocker, damping devices comprising a piston rod up against elastic return devices and connected to a body of a corresponding floating reducer by means of a lever.

7. Handling flask according to claim 1, wherein said motor means for driving each of said winches is in the form of an assembly comprising an electric motor in a position remote from said drums driven by said motor means.

8. Handling flask according to claim 7, wherein said motor assembly comprises, in addition to said electric motor, a bevel-gear transmission device and, for each of said drums driven by said motor assembly, a main reducer and a secondary reducer driven by means of a bevel-gear device and connected to said main reducer by means of a shaft comprising at least one cardan joint.

9. Handling flask according to claim 8, wherein said main reducers are floating-body reducers mounted on a rotary axle of a corresponding drum.

10. Handling flask according to claim 1, wherein each of said first and second cables pass successively over a first deflecting pulley, over a supporting pulley and over a second deflecting pulley on a run of said pulleys between said drums arranged opposite one another, said deflecting pulleys being mounted rotatably on said hollow body and said supporting pulley on said support of said grab by means of horizontal axles, bottoms of grooves of said two deflecting pulleys and of said supporting pulley associated with each of said cables being arranged in a vertical plane passing through said axis of said channel.

* * * * *